US011667277B2

(12) United States Patent
Kamiya et al.

(10) Patent No.: US 11,667,277 B2
(45) Date of Patent: Jun. 6, 2023

(54) DRIVING ASSISTANCE CONTROL APPARATUS AND METHOD FOR VEHICLE, AND DRIVING ASSISTANCE SYSTEM FOR VEHICLE

(71) Applicant: DENSO CORPORATION, Kariya (JP)

(72) Inventors: Kei Kamiya, Kariya (JP); Atsushi Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 278 days.

(21) Appl. No.: 17/018,530

(22) Filed: Sep. 11, 2020

(65) Prior Publication Data
US 2020/0406891 A1  Dec. 31, 2020

Related U.S. Application Data

(63) Continuation of application No. PCT/JP2019/000238, filed on Jan. 8, 2019.

(30) Foreign Application Priority Data

Mar. 14, 2018 (JP) .............................. JP2018-046101

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............. B60W 30/09; B60W 30/0953; B60W 30/0956; B60W 40/072; B60W 2510/20;
(Continued)

(56) References Cited

U.S. PATENT DOCUMENTS

2005/0222729 A1* 10/2005 Sakata ................ B60W 10/184
701/38
2014/0114526 A1* 4/2014 Erb ........................ B66F 17/003
701/28
(Continued)

FOREIGN PATENT DOCUMENTS

JP   2016-164031 A   9/2016

*Primary Examiner* — Abby Y Lin
*Assistant Examiner* — Danielle Marie Jackson
(74) *Attorney, Agent, or Firm* — Maschoff Brennan

(57) ABSTRACT

In a driving assistance control apparatus for a vehicle, an acquisition unit is configured to acquire a detected traveling state of the vehicle and a detected traveling environment of the vehicle. A control unit is configured to, when a curvature radius of a travel trajectory of the vehicle is equal to or less than a predetermined radius threshold, cause a driving assistance unit to perform collision avoidance assistance using, as an activation area of the collision avoidance assistance, a reduced activation area obtained by reducing a reference activation area, and when determining that the vehicle is making a constant turn, cause the driving assistance unit to perform the collision avoidance assistance by using the traveling state of the vehicle and the traveling environment of the vehicle and the reference activation area even if the curvature radius of the travel trajectory is equal to or less than the radius threshold.

7 Claims, 6 Drawing Sheets

(51) Int. Cl.
*B60W 40/072* (2012.01)
*G05D 1/02* (2020.01)

(52) U.S. Cl.
CPC ......... *B60W 40/072* (2013.01); *G05D 1/0212* (2013.01); *B60W 2510/20* (2013.01)

(58) Field of Classification Search
CPC ....... B60W 2510/205; B60W 2540/18; B60W 30/095; G05D 1/0212; B60T 7/12; G08G 1/16
See application file for complete search history.

(56) References Cited

U.S. PATENT DOCUMENTS

| | | | |
|---|---|---|---|
| 2015/0232089 A1* | 8/2015 | Niino | B60W 50/0098 701/1 |
| 2016/0221549 A1 | 8/2016 | Tanase et al. | |
| 2018/0206392 A1* | 7/2018 | Matsuzaki | G05D 1/021 |

* cited by examiner

DRIVING ASSISTANCE CONTROL APPARATUS AND METHOD FOR VEHICLE, AND DRIVING ASSISTANCE SYSTEM FOR VEHICLE

CROSS-REFERENCE TO RELATED APPLICATION

The present application is based on and claims the benefit of priority from Japanese Patent Application No. 2018-046101 filed in Japan on Mar. 14, 2018, all the disclosure of which is incorporated herein by reference.

BACKGROUND

Technical Field

The present disclosure relates to a technique for controlling driving assistance in a vehicle for suppressing or avoiding a collision with a target object.

Related Art

A technique is known for setting an activation area depending on a length or height of a target object. Driving assistance for suppressing or avoiding a collision with the target object is activated in response to the target object entering the activation area.

DESCRIPTION OF SPECIFIC EMBODIMENTS

Figure 1:
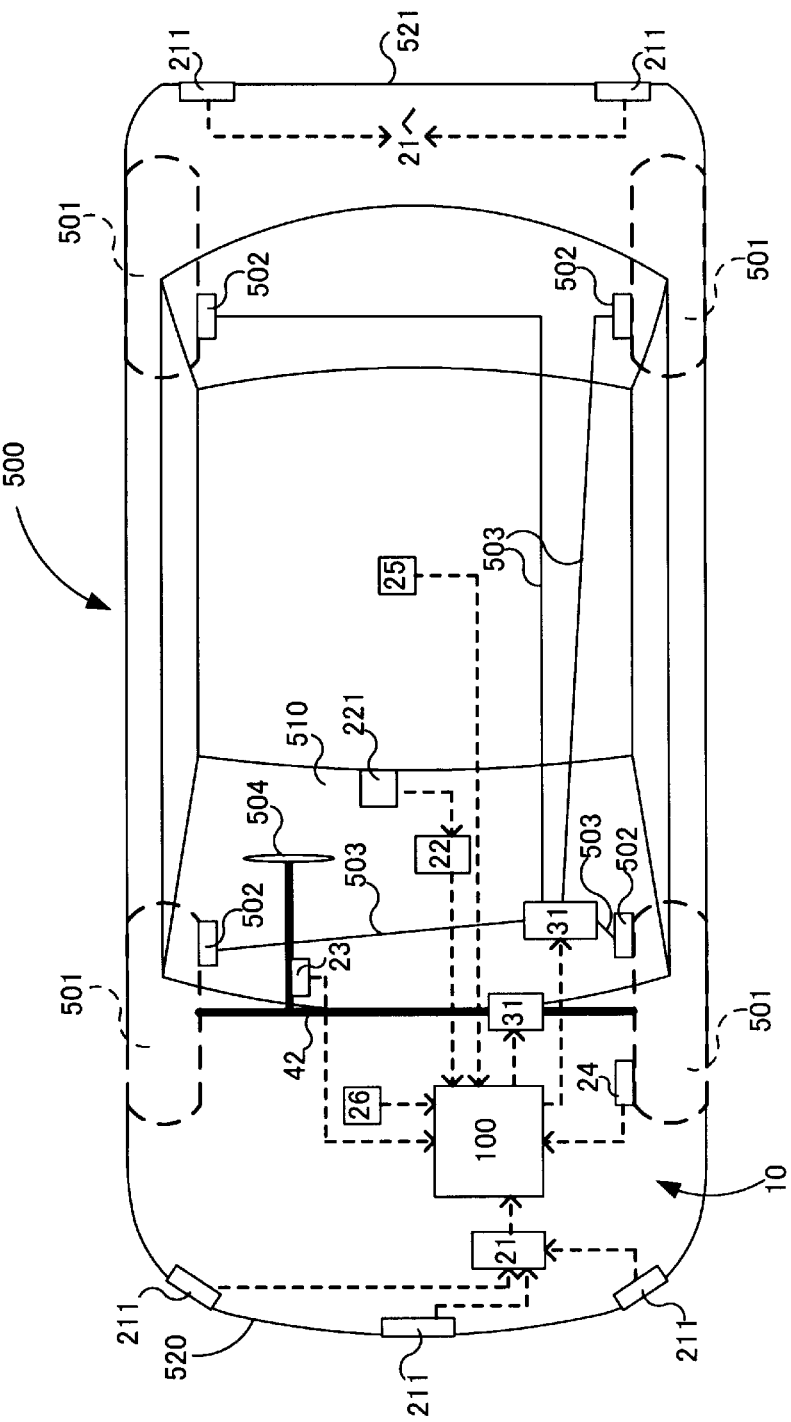
FIG. 1 is a schematic diagram of a vehicle equipped with a driving assistance control apparatus according to a first embodiment.

When a subject vehicle is traveling with steering operations, it is not easy in many cases to determine a travel trajectory of the subject vehicle, for example, a moving direction of the subject vehicle, and it is also not easy to discriminate a target object from detected objects, which is likely to collide with the subject vehicle. The above known technique, as disclosed in JP-A-2016-164031, may activate driving assistance with respect to a non-target object under circumstances where it is not easy to discriminate the target object, which may cause passengers of the subject vehicle, including a driver of the subject vehicle, to feel discomfort and anxiety. While it is necessary to avoid such unnecessary driving assistance being performed, it is desired that proper driving assistance be performed under conditions that unnecessary driving assistance can be avoided.

In view of the foregoing, it is desired to perform appropriate driving assistance during traveling of the subject vehicle with steering operations.

A first aspect of the present disclosure provides a driving assistance control apparatus for a vehicle. The driving assistance control apparatus for a vehicle in the first aspect includes: an acquisition unit that acquires a detected traveling state of the vehicle and a detected traveling environment of the vehicle; and a control unit that, when a curvature radius of a travel trajectory of the vehicle is equal to or less than a predetermined radius threshold, causes a driving assistance unit to perform collision avoidance assistance using a reduced activation area obtained by reducing a reference activation area, as an activation area of the collision avoidance assistance, and when determining that the vehicle is making a constant turn, causes the driving assistance unit to perform the collision avoidance assistance by using the traveling state of the vehicle and the traveling environment of the vehicle and the reference activation area even if the curvature radius of the travel trajectory is equal to or less than the radius threshold.

According to the driving assistance control apparatus for the vehicle in the first aspect, it is possible to perform appropriate driving assistance while the subject vehicle is traveling with steering operations.

A second aspect of the present disclosure provides a driving assistance system. The driving assistance system in the second aspect includes: the driving assistance control apparatus according to the first aspect; a detection unit that detects the traveling state and traveling environment; and the driving assistance unit that performs the collision avoidance assistance under an instruction from the control unit.

According to the driving assistance system in the second aspect, it is possible to perform appropriate driving assistance while the subject vehicle is traveling with steering operations.

A third aspect of the present disclosure provides a driving assistance control method for a vehicle. The driving assistance control method for a vehicle in the third aspect includes: acquiring a detected traveling state of the vehicle and a detected traveling environment of the vehicle; when a curvature radius of a travel trajectory of the vehicle is equal to or less than a predetermined radius threshold, setting an activation area of collision avoidance assistance to a reduced activation area obtained by reducing a reference activation area; and when it is determined whether the vehicle is making a constant turn, performing a collision avoidance assistance process by using the traveling state of the vehicle and the traveling environment of the vehicle and the reference activation area even if the curvature radius of the travel trajectory is equal to or less than the radius threshold.

According to the driving assistance control method for the vehicle in the third aspect, it is possible to perform appropriate driving assistance while the subject vehicle is traveling with steering operations. The present disclosure can also be carried out as a driving assistance control program for a vehicle or a computer-readable recording medium recording the program.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

As illustrated in FIG. 1, a driving assistance control apparatus 100 for a vehicle according to a first embodiment is installed and used in a vehicle 500. The driving assistance control apparatus 100 includes at least a control unit and an acquisition unit. A driving assistance system 10 includes, in addition to the driving assistance control apparatus 100, a radar ECU 21, a camera ECU 22, a rotation angle sensor 23, a wheel speed sensor 24, a yaw rate sensor 25, a positioning sensor 26, and a driving assistance device 31. The vehicle 500 includes wheels 501, brake devices 502, a brake line 503, a steering wheel 504, a front windshield 510, a front bumper 520, and a rear bumper 521. The radar ECU 21 is connected to millimeter radars 211 that emit radio waves and use reflected waves from an object acquired by the millimeter radars 211 to generate and output detection signals indicating the object by reflection points. The camera ECU 22 is connected to a monocular camera 221 and use an image acquired by the camera 221 and a prepared shape pattern of the object to generate and output a detection signal indicating the object by the image. Each of the ECUs 21 and 22 is a micro-processor including a processing unit, a storage unit, and an input/output unit. Detectors that detect reflected waves may be laser radars (Lidars) or ultrasonic wave detectors that emit sound waves and detect reflected waves, instead of the millimeter radars 211. The image capturing unit that captures images of the target object may be a stereo camera or a multi-camera formed of two or more cameras, instead of the monocular camera 221. In addition, a rear camera or a side camera may be provided.

The brake devices 502 are included in the corresponding wheels 501. The brake devices 502 are, for example, disc brakes, or drum brakes that apply brakes to the corresponding wheels 501 by braking force depending on a brake fluid pressure supplied via the brake line 503 in response to the driver's operation on the brake pedal, thereby implement braking of the vehicle 500. The brake line 503 includes a brake piston and a brake fluid line that generate a brake fluid pressure in response to a brake pedal operation. Instead of the brake fluid line, the brake line 503 may be a control signal line that is configured to activate an actuator included in each of the brake devices 502.

The steering wheel 504 is connected to the front wheels 501 via a steering device 42 including a steering rod, a steering mechanism, and a turn axle. The steering device 42 may be provided with a steering power assistance device for reducing steering forces.

The driving assistance device 31, which is a driving assistance unit, is provided along the brake line 503 and includes a braking assistance device capable of fluid pressure control by an actuator, for example, an electric motor, independently from a brake pedal operation, a steering assistance device capable of driving the steering device 42 by an actuator, for example, an electric motor, and an output control device that controls outputs of the internal combustion engine and electric motor that are motive power sources for traveling. The driving assistance device 31 performs braking assistance, steering assistance, and collision avoidance assistance in response to results of detection by the millimeter radars 211 and the camera 221.

Figure 2:
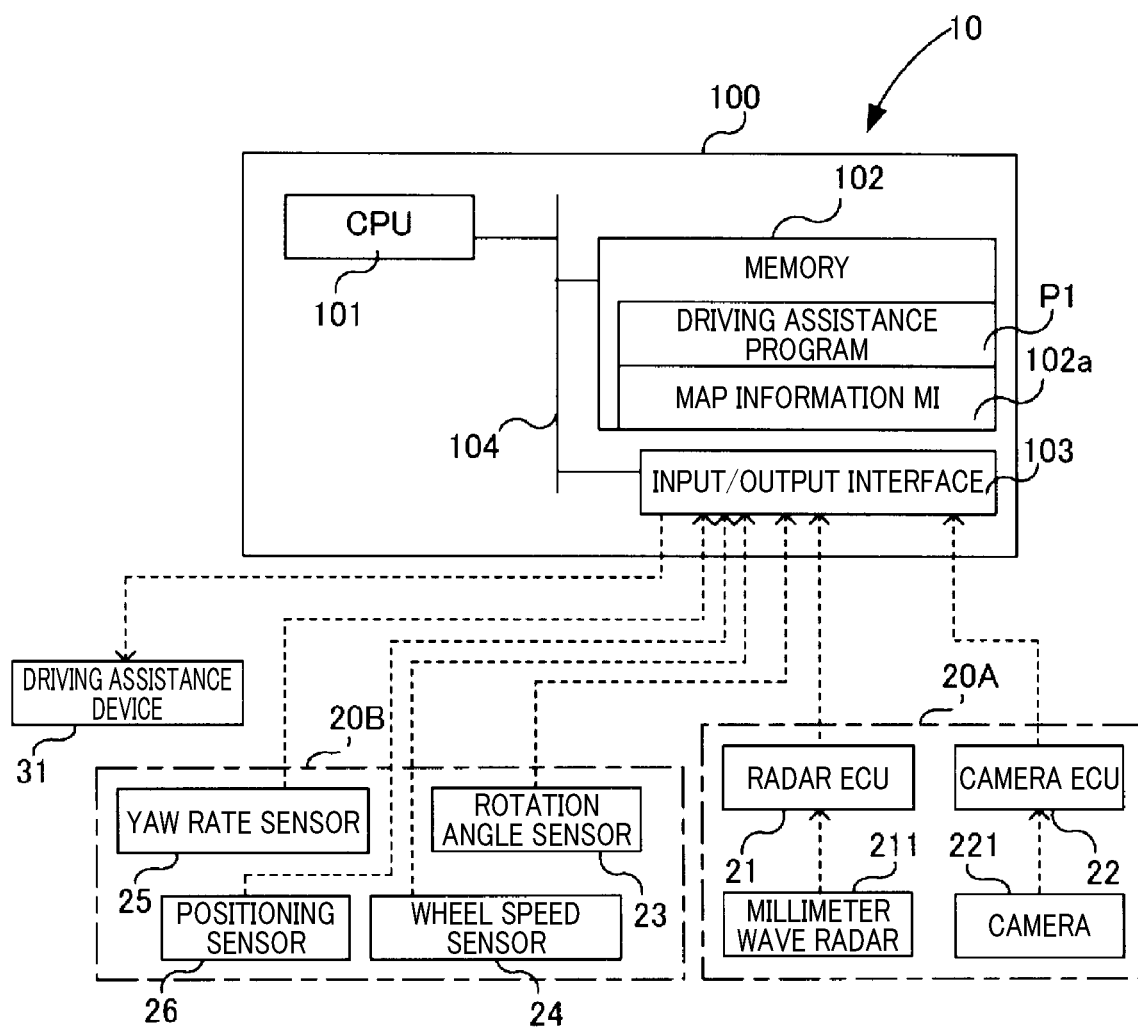
FIG. 2 is a functional block diagram of the driving assistance control apparatus according to the first embodiment.

As illustrated in FIG. 2, the driving assistance control apparatus 100 includes a central processing unit (CPU) 101 as a control unit, a memory 102, an input/output interface 103 as an acquisition unit, and a bus 104. The CPU 101, the memory 102, and the input/output interface 103 are connected together via the bus 104 in a manner being capable of bidirectional communication. The memory 102 includes a memory that stores a driving assistance program P1 for performing driving assistance in a non-volatile and read-only manner, for example, a ROM, and a memory readable and writable by the CPU 101, for example, a RAM. The memory 102 further includes a map information storage area 102a for storing map information MI that can be used in a navigation system. The CPU 101 loads the driving assistance program P1 from the memory 102 into the readable/writable memory and performs the same there to set an activation area of collision avoidance assistance to a reference activation area or a reduced activation area obtained by reducing the reference activation area, and controls the driving assistance device 31 to implement a function of the control unit to perform a collision avoidance assistance process. The CPU 101 may be a single CPU, a plurality of CPUs executing various programs, or a multi-core CPU that can perform a plurality of programs at the same time.

The input/output interface 103 is connected to the radar ECU 21, the camera ECU 22, the rotation angle sensor 23, the wheel speed sensor 24, the yaw rate sensor 25, the positioning sensor 26, and the driving assistance device 31 via their respective control signal lines. The input/output interface 103 receives detection signals from the radar ECU 21, the camera ECU 22, the rotation angle sensor 23, the wheel speed sensor 24, the yaw rate sensor 25, and the positioning sensor 26. The input/output interface 103 outputs control signals indicating an operating state of the vehicle, such as a brake level and a steering angle, to the driving assistance device 31. Therefore, the input/output interface 103 serves as an acquisition unit that acquires a traveling state of the subject vehicle and a traveling environment around the subject vehicle detected by the various sensors. The radar ECU 21 and the millimeter radars 211, and the camera ECU 22 and the monocular camera 221 serve as a traveling environment detection device 20A. The rotation angle sensor 23, the wheel speed sensor 24, the yaw rate sensor 25, and the positioning sensor 26 serve as a traveling state detection device 20B.

The millimeter radars 211 are sensors that emit millimeter waves and receive reflected waves from an object to detect a distance, a relative speed, and an angle of the object. In the present embodiment, the millimeter radars 211 is located on the center and both sides of the front bumper 520 and on the both sides of the rear bumper 521. Unprocessed detection signals output from the millimeter radars 211 are processed by the radar ECU 21 and are input as detection signals formed of points or point lines indicating one or more representative positions of the object to the driving assistance control apparatus 100. Alternatively, the radar ECU 21 may not be provided so that signals indicating unprocessed reception waves are input as detection signals from the millimeter radars 211 to the driving assistance control apparatus 100. In the case of using unprocessed reception signals as detection signals, the driving assistance control apparatus 100 performs signal processing to determine a position of and a distance to the object.

The camera 221 is an imaging device that includes one imaging element such as a CCD and is a sensor that detects outer shape information of a target object by receiving visible light and outputs a detection result as image data. The image data output from the camera 221 is subjected to a feature point extraction process by the camera ECU 22, a pattern indicated by the extracted feature points is compared to a prepared comparative pattern indicating an outer shape of a target object to be discriminated, that is, a vehicle. When there is a match or similarity between the extracted pattern and the comparative pattern, a frame image showing the discriminated target object is generated. On the other hand, when there is a mismatch or dissimilarity between the extracted pattern and the comparative pattern, that is, when these patterns are non-analogous, no frame image is generated. When the image data shows a plurality of target objects, the camera ECU 22 generates a plurality of frame images showing the corresponding discriminated target objects, and inputs them as a detection signal to the driving assistance control apparatus 100. Each frame image is represented by pixel data that includes positional information, that is, coordinate information of the discriminated target object. The number of frame images that can be included in the detection signal depends on the bandwidth between the camera ECU 22 and the driving assistance control apparatus 100. Instead of providing the camera ECU 22 separately, unprocessed image data captured by the camera 221 may be input as a detection signal to the driving assistance control apparatus 100. In this case, the driving assistance control apparatus 100 may perform target discrimination using an outer shape pattern of the target object to be discriminated. In the present embodiment, the camera 221 is located at the upper center of the front windshield 510. The pixel data output from the camera 221 is monochrome pixel data or color pixel data. When it is desired that a target object to be discriminated is an object other than a vehicle, for example, a traffic light or a road sign such as a traffic lane or a stop line, the camera ECU 22 may prepare an outer shape pattern of the desired target object and output frame images showing the desired target object as a detection signal. In this case, a suitable frame image can be selectively used in the following process by the driving assistance control apparatus 100. The same applies to the case where a rear camera is provided.

The rotation angle sensor 23 is a torque sensor that detects the amount of twist in the steering rod, that is, a steering torque caused by steering of the steering wheel 504, and detects the steering angle of the steering wheel 504. In the present embodiment, the rotation angle sensor 23 is included in the steering rod connecting between the steering wheel 504 and the steering mechanism. A detection signal output from the rotation angle sensor 23 indicates a voltage value proportional to the amount of twist.

The wheel speed sensors 24 are sensors that detect the rotation speeds of the wheels 501 and are provided to the corresponding wheels 501. Detection signals output from the wheel speed sensors 24 are pulse waves that indicate the voltage value proportional to the wheel speed or an interval corresponding to the wheel speed. Using the detection signals from the wheel speed sensors 24 makes it possible to obtain information about a vehicle speed, a traveling distance, and the like.

The yaw rate sensor 25 is a sensor that detects the rotation angular speed of the vehicle 500. The yaw rate sensor 25 is located in the center of the vehicle, for example. A detection signal output from the yaw rate sensor 25 indicates a voltage value proportional to the rotation direction and the angular speed. The detected voltage value may indicate a lane change or a turn of the vehicle 500.

The positioning sensor 26 is a sensor that receives signals from satellites and base stations and determines a location of the subject vehicle, such as a global navigation satellite system (GNSS) receiver or a mobile communication transceiver, for example. The location of the subject vehicle is handled as current location information of the subject vehicle.

Figure 3:
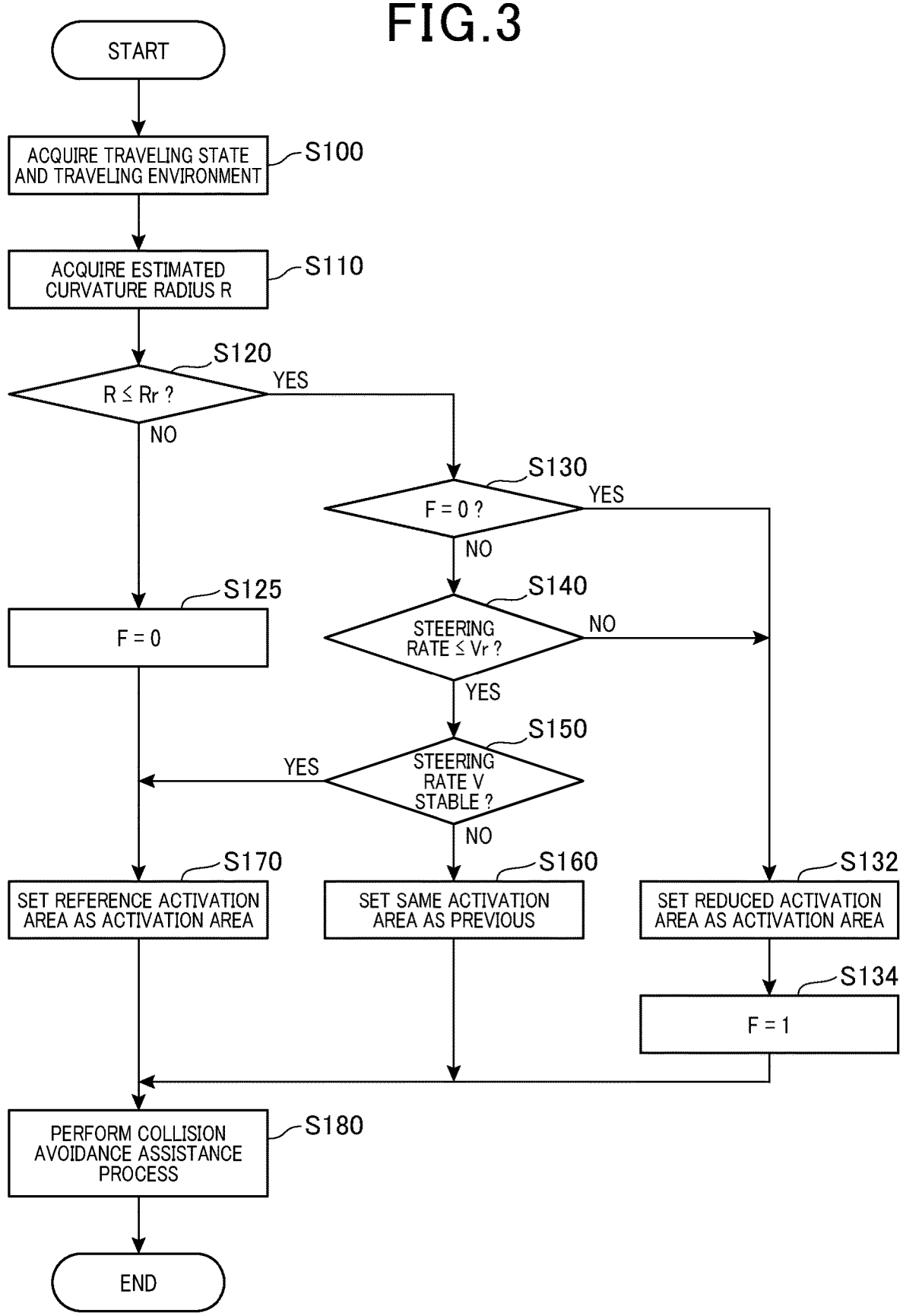
FIG. 3 is a flowchart of a driving assistance process performed by the driving assistance control apparatus according to the first embodiment.

A driving assistance process performed by the driving assistance control apparatus 100 according to the first embodiment will be described. The process routine illustrated in FIG. 3 is repeatedly performed at predetermined time intervals from start up to shut down of the control system of the vehicle or from turn-on to turn-off of the start switch. The driving assistance process in the present embodiment includes, for example, a braking assistance process and a steering assistance process. The braking assistance process includes sudden braking and slow braking for avoidance of a collision with a target vehicle. The steering assistance process includes steering for avoidance of a collision with a target vehicle and steering for prevention of a lane departure.

The CPU 101 acquires the traveling environment from the traveling environment detection device 20A and acquires the traveling state from the traveling state detection device 20B via the input/output interface 103 as the acquisition unit (in step S100). The traveling environment means the states and conditions of the surroundings of the subject vehicle, that is, of the outside world, which includes, for example, information on the positions, speeds, shapes, and states of objects to the front, back, right, and left of the subject vehicle. The objects include, for example, other vehicles, roads, road markings, and road signs. The traveling state of the vehicle is information about the subject vehicle, which includes, for example, the speed of the vehicle 500, the direction of the vehicle 500, and the rotation angular speed of the vehicle 500.

Figure 4:
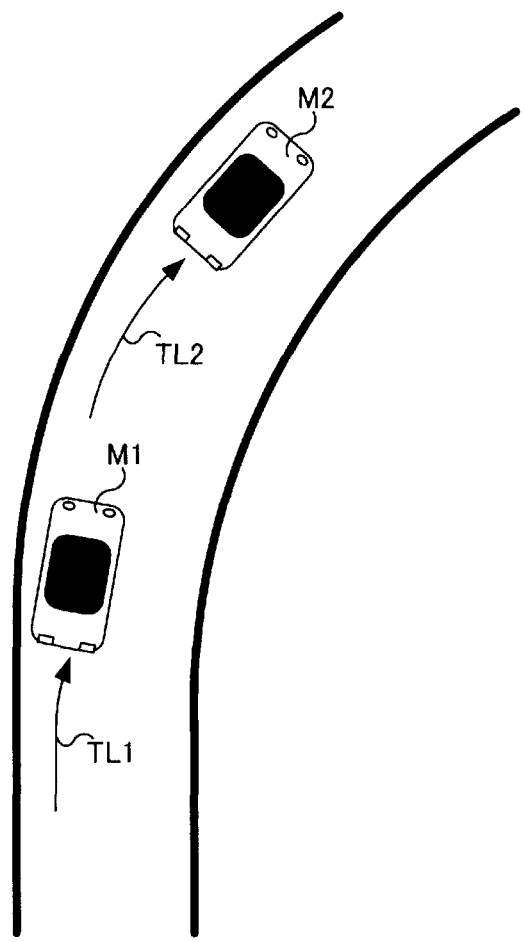
FIG. 4 is an illustration of turning situations of vehicles on a curved road.

The CPU 101 acquires an estimated curvature radius R (m) of travel trajectory of the subject vehicle (in step S110). The travel trajectory includes an expected trajectory in which the subject vehicle is expected to travel and a travel path of the subject vehicle. The estimated curvature radius R refers to a curvature radius of the expected trajectory or the travel path, which is a turning radius of a vehicle M3 associated with a steering operation of the vehicle M3 as illustrated in FIG. 4. In the example illustrated in FIG. 4, a vehicle M1 is about to enter a curved road from a straight road along a travel trajectory TL1, and a vehicle M2 is traveling in a travel trajectory TL2 on the curved road. In the example illustrated in FIG. 5, the vehicle M3 is meandering in a travel trajectory TL3 on a straight road. The estimated curvature radius R is determined using information included at least one of the traveling state and the traveling environment, and, for example, is determined by $R=v/\omega$ where v denotes the speed of the subject vehicle (m/s) and $\omega$ denotes the rotation angular speed of the subject vehicle (rad/s). The estimated curvature radius R may be calculated in step S110 or may be repeatedly calculated at predetermined time intervals separately from the processing routine illustrated in FIG. 3. Besides, the estimated curvature radius R can be calculated or acquired by a combination of the subject vehicle location acquired by the positioning sensor 26 and the road shape information contained in the map information MI, by the steering angle of the steering wheel 504, by image processing of images captured by the camera 221, or by a matching process of the subject vehicle location determined by the positioning sensor 26 and the captured images.

Figure 6:
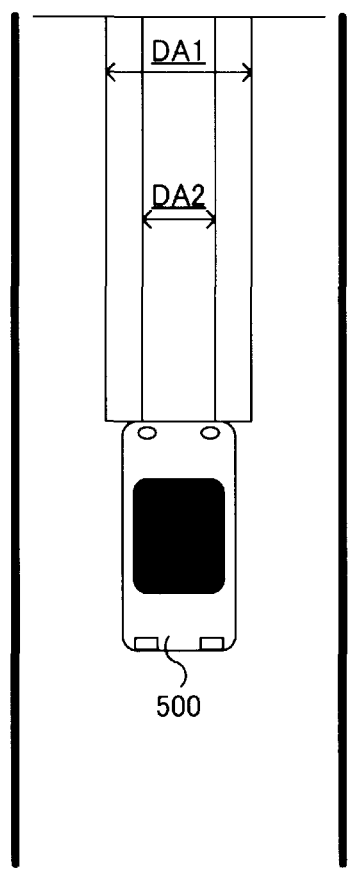
FIG. 6 is an illustration of a reference activation area and a reduced activation area.

The CPU 101 determines whether the acquired estimated curvature radius R is equal to or less than a predefined determination curvature radius Rr, that is, $R \leq Rr$ (in step S120). The determination curvature radius Rr is a small curvature radius with which driving assistance may be performed even against an object that is not a target object of the driving assistance. The determination curvature radius Rr is a curvature radius of a curved road, for example, such that guard rails, walls, curbs, and markings ahead on the roadsides are included in a reference activation area ahead of the vehicle 500 that is predefined as an activation area of collision avoidance assistance. While traveling along the road, the vehicle 500 may not actually move toward these guard rails, walls, curbs, and markings ahead on the roadsides. However, at a point in time when the curvature radius is acquired, distances between the vehicle 500 and these objects may be so short that it is determined that there is a possibility of a collision, and then unnecessary collision avoidance assistance may be performed. Thus, when the estimated curvature radius R is equal to or less than the predefined determination curvature radius Rr, a reduced activation area DA2 may be used instead of a reference activation area DA1 that is defined by straight lines extended forward from both the widthwise ends of the subject vehicle as illustrated in FIG. 6. The reduced activation area DA2 is obtained by reducing, in the widthwise or lateral direction of the vehicle 500, the reference activation area DA1 that is predefined under assumption that the vehicle travels straight ahead. An amount of reduction may increase with a decrease of the estimated curvature radius R and may be reduced not only in the widthwise direction of the vehicle 500 but also in a direction perpendicular to the widthwise direction.

In the present embodiment, even if the estimated curvature radius R is equal to or less than the predefined determination curvature radius Rr, when the subject vehicle is making a constant turn, the reference activation area DA1 is set as the activation area to increase the occasions of determination to perform collision avoidance assistance. That the subject vehicle is making a constant turn means that the estimated curvature radius R is substantially constant and the travel path forms a substantially fixed arc. Whether the subject vehicle is making a constant turn is determined by the steering rate and changes in the steering rate with time as described later. When determining that R≤Rr ("Yes" branch in step S120), the CPU 101 then determines whether a curvature radius flag F indicating whether it has been determined that the estimated curvature radius R is equal to or less than the predefined determination curvature radius Rr is set to 0. That is, the CPU 101 determines whether it has been firstly determined that R≤Rr. When determining that F=0, ("Yes" branch in step S130), the CPU 101 sets the reduced activation area DA2 as the activation area (in step S132), sets the curvature radius flag F to 1, and proceeds to step S180. That is, when determining that R≤Rr, the CPU 101 first sets the reduced activation area DA2 as the activation area.

When not determining that F=0 ("No" branch in step S130), the CPU 101 then determines whether the steering rate V (deg/sec) is equal to a predefined determination steering rate Vr (deg/sec) (in step 140). Specifically, if the reduced activation area DA2 is already set as the activation area, the CPU 101 subsequently sets the reference activation area DA1 as the activation area when the subject vehicle is making a constant turn. The steering rate V may be, for example, the rotation angular speed of the vehicle 500 detected by the yaw rate sensor 25 or the rotation angular speed of the steering wheel 504 acquired by the rotation angle sensor 23. The steering rate V takes a positive or negative value in a left-right direction with reference to the neutral position of the steering wheel 504. In the present embodiment, this means the absolute value of the steering rate V, that is, the magnitude of the steering rate V, and it is determined whether 0≤the steering rate V≤the determination steering rate Vr. The steering rate V is used to determine whether the turning action of the vehicle 500 is large or small. Instead of the steering rate V, the steering angle may be used. This is because, in general, when the steering angle is large, the vehicle frequently takes a large turning action with unstable turning behavior.

Figure 5:
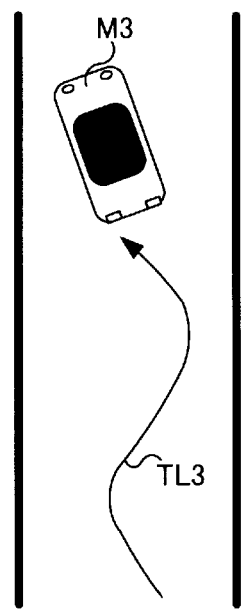
FIG. 5 is an illustration of a turning situation of a vehicle on a straight road.

When not determining that the steering rate V≤the determination steering rate Vr ("No" branch in step S140), the CPU 101 proceeds to step S132. The case where the steering rate V≤the determination steering rate Vr does not hold may occur, for example, in a traveling state of the vehicle M1 that is about to enter a curved road from a straight road as illustrated in FIG. 4 or the vehicle M3 that is meandering in a straight road as illustrated in FIG. 5. When the steering rate V is high, the turning action of the vehicle M1 or M3 is fluctuating with a large degree of turn as shown in the travel trajectory TL1 or TL3, so that it can not be said that the vehicles M1 and M3 are making a constant turn. Therefore, the reduced activation area DA2 is set as the activation area to reduce or avoid unnecessary collision avoidance assistance performed against an object on the roadside as a target object. In addition, when the reference activation area DA1 is currently set as the activation area and the steering rate V≤the determination steering rate Vr holds, the reduced activation area DA2 is set as the activation area. For example, when the driver performs an abrupt steering operation during a constant turn, the activation area is changed from the reference activation area DA1 to the reduced activation area DA2.

Figure 7:
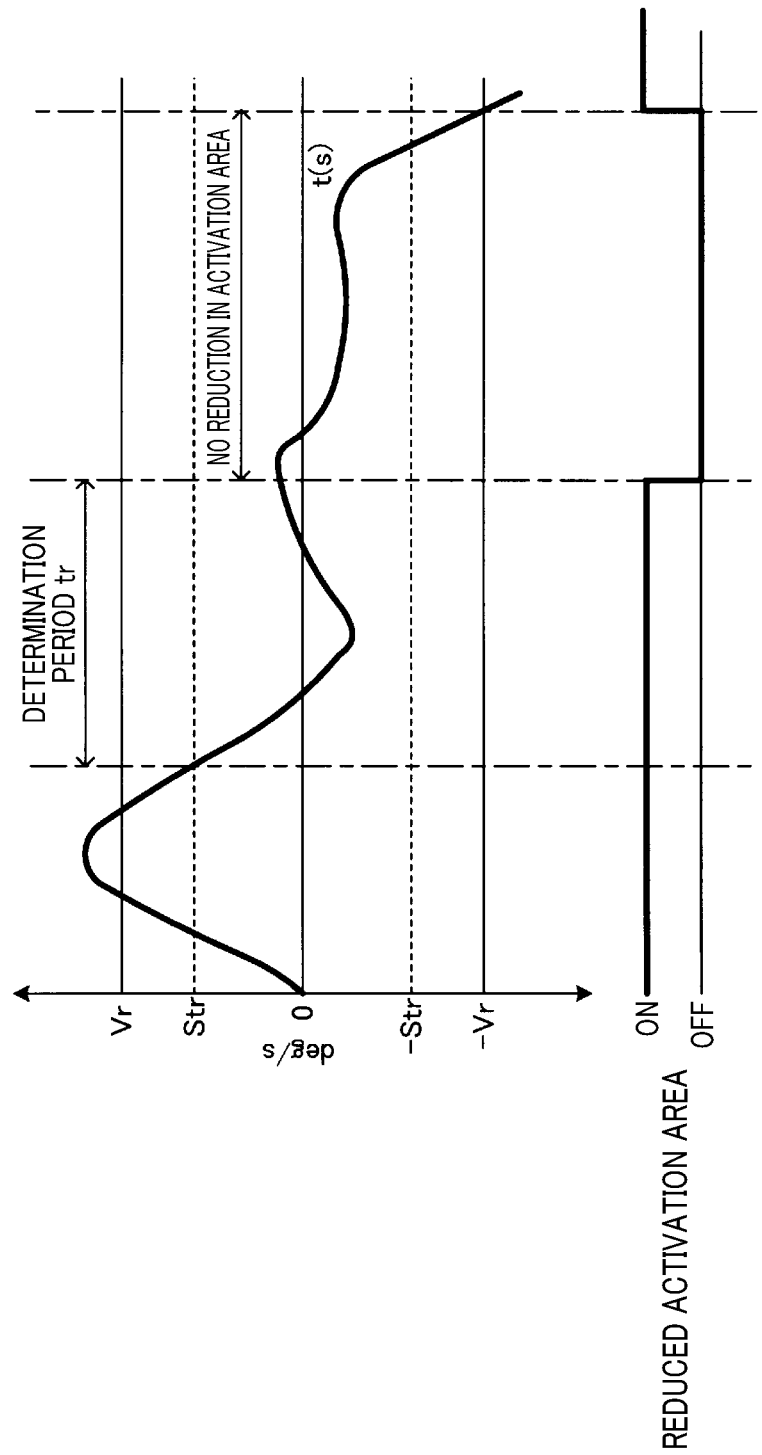
FIG. 7 is an illustration of an example of changes in steering rate with turn-on/off of the reduced activation area during a driving assistance control process being performed according to the first embodiment.

When determining that the steering rate V≤the determination steering rate Vr ("Yes" branch in step S140), the CPU 101 then determines whether the steering rate V is stable (in step S150). The case where the steering rate V is stable may occur in the traveling state of the vehicle M2 that is traveling in the travel trajectory TL2 on a curved road as illustrated in FIG. 4. Whether the steering rate V is stable can be determined, for example, by determining whether the absolute value of the steering rate V is equal to or less than a stability determination speed Str, that is, whether 0≤the steering rate V≤Str over a determination period Tr as illustrated in FIG. 7. The stability determination speed Str can be said to be a varying threshold or a determination steering rate for determining that the steering rate V is stable. In the present embodiment, the stability determination speed Str≤the determination steering rate Vr. Since that the steering rate V is stable is the same as that the steering angle is generally constant, it may be determined whether the steering rate V is stable based on whether the steering angle is within a predefined range of variations over the determination period tr. Even if the turning trajectory is generally constant, a small correction is commonly made to the steering angle. When the change of the steering rate V or the steering angle over time is within a range of small corrections, it can be determined that the turning action of the vehicle M2 is stable. The steering rate V used in the determination as whether the steering rate V is stable may be the steering rate or the rotation angular speed output from either the rotation angle sensor 23 or the yaw rate sensor 25. From the viewpoint of estimating the driver's steering operation more properly, it is desirable that the steering angle of the steering wheel 504 directly operated by the driver is used.

When determining that the steering rate V is stable ("Yes" branch in step S150), the CPU 101 proceeds to step S170 to set the reference activation area DA1 as the activation area. That is, when the steering rate V is equal to or less than the determination steering rate Vr and the steering rate V is stable, the CPU 101 determines that the vehicle 500 is making a constant turn, and sets the reference activation area DA1 as the activation area even if the estimated curvature radius R is equal to or less than the determination curvature radius Rr.

When not determining that the steering rate V is stable ("No" branch in step S150), the CPU 101 proceeds to step S160 to set the same activation area as previous to maintain the current activation area. That is, in the present embodiment, the CPU 101 determines whether to set the reduced activation area DA2 by use of the determination steering rate Vr and determines whether to maintain or change the activation area by use of the stability determination speed Str. The stability determination speed Str can be said to be a determination steering rate for determining whether the steering rate V is stable. A difference between the determination steering rate Vr and the stability determination speed Str that are set to different values causes hysteresis or a dead band to suppress frequent switching between the reference activation area DA1 and the reduced activation area DA2. It is noted that Vr=Str may hold.

When not determining that R≤Rr ("No" branch in step S120), the CPU 101 sets the curvature radius flag F to zero (in step S125) and sets the reference activation area as the activation area (in step S170). That is, the estimated curvature radius R is greater than the determination curvature radius Rr and there is a low possibility of unnecessary driving assistance being performed against an object on the roadside, and thus the reference activation area DA1 is set as the activation area.

The CPU 101 performs a collision avoidance assistance process using the currently set activation area (in step S180), and then terminates this processing routine. In the collision avoidance assistance process, the CPU 101 identifies the object as a target of collision avoidance assistance in the activation area by use of the traveling environment information, and uses the relationship in position and relative speed between the identified object and the subject vehicle obtained from the traveling state information and the traveling environment information to perform a driving assistance process to calculate a control command value for performing at least one of braking assistance including sudden braking at a high brake level for collision avoidance and steering assistance including sudden steering at a large steering angle or a high steering rate. The CPU 101 transmits the calculated control command value to the driving assistance device 31 to perform collision avoidance assistance as driving assistance.

According to the driving assistance control apparatus 100 in the first embodiment, as illustrated in FIG. 7, when the estimated curvature radius R is equal to or less than the determination curvature radius Rr and the vehicle is not making a constant turn, that is, when V>Vr and V>Str hold, the activation area is reduced to the reduced activation area DA2. After that, when V≤Vr holds and V≤Str continues to hold over the determination period tr, it is determined that the vehicle is making a constant turn and the reduction in the activation area is cleared to set the reference activation area DA1. After that, even when V>Str holds, it is continuously determined that the vehicle is making a constant turn and the reference activation area DA1 is maintained as the activation area until V>Vr holds. Then, when V>Vr holds, it is no longer determined that the vehicle is making a constant turn, and the activation area is reduced to the reduced activation area DA2. The determination period tr may take a fixed value or a variable value depending on the speed or steering angle of the vehicle 500 as far as the period is sufficient to determine the stability of the turning action of the vehicle 500. In the case where the determination period tr takes a variable value, the determination period tr may be set to increase as the speed of the vehicle 500 becomes higher or as the steering angle of the vehicle 500 becomes larger. This is because, under these conditions, the vehicle 500 exhibits relatively steep turning behavior and thus a longer-term determination is desired for estimation of stability.

As explained above, according to the driving assistance control apparatus 100 in the first embodiment, when the vehicle is making a constant turn even if the estimated curvature radius R is equal to or less than the determination curvature radius Rr, the driving assistance process can be performed using the reference activation area DA1, rather than the reduced activation area DA2. This makes it possible to perform collision avoidance assistance with respect to a wider range of objects while suppressing or preventing implementation of unnecessary collision avoidance assistance, without reducing the activation area even if the vehicle 500 is making a turn on a curved road or the like. Therefore, it is possible to increase the occasions of performing collision avoidance assistance during turning of the vehicle 500 and reduce or prevent a collision or contact between the subject vehicle and the target object by implementation of collision avoidance assistance during turning of the vehicle.

Other Embodiments (1) In the driving assistance control apparatus 100 according to the first embodiment, when the steering rate V≤the determination steering rate Vr holds and the steering rate V is stable, it is determined that the vehicle 500 is making a constant turn and the reference activation area DA1 is set as the activation area. In an alternative embodiment, it may be determined that the vehicle 500 is making a constant turn when the steering rate V≤the determination steering rate Vr holds, without determining whether the steering rate V is stable. This is because, when the steering rate V is equal to or less than the determination steering rate Vr, the behavior of the vehicle 500 is relatively stable and thus it can be determined that the vehicle 500 is making a constant turn. In this case, using a small value of the determination steering rate Vr makes it possible to more properly determine that the vehicle 500 is making a constant turn by using only the steering rate V.

(2) In the foregoing embodiment, the control unit is implemented by means of software by the CPU 101 executing the driving assistance program P1. In an alternative embodiment, the control unit may be implemented by means of hardware by a pre-programmed integrated circuit or discrete circuit.

As above, the present disclosure has been described based on the embodiments and modifications. However, the embodiments of the present disclosure described above are intended to make the present disclosure easy to understand and should not be interpreted as limiting the present disclosure. The present disclosure can be modified or improved without deviating from the gist of the present disclosure and the scope of the claims, and the present disclosure includes its equivalents. For example, the technical features of the embodiments and modifications corresponding to the technical features of the modes described in the section of the summary of the disclosure can be replaced or combined as appropriate to solve some or all of the issues described above or attain some or all of the advantageous effects described above. In addition, the technical features can be deleted as appropriate unless they are described herein as being essential.

For example, the driving assistance control apparatus for a vehicle according to the first aspect described above can be set as Example 1. The driving assistance control apparatus according to Example 1 in which the control unit determines whether the vehicle is making a constant turn by using a steering rate as the traveling state can be set as Example 2. The driving assistance control apparatus for a vehicle according to Example 2 in which the control unit determines that the vehicle is making a constant turn when the steering rate is equal to or less than a predetermined speed threshold can be set as Example 3. The driving assistance control apparatus for a vehicle according to Example 2 in which the control unit determines that the vehicle is making a constant turn when the steering rate is equal to or less than the predetermined speed threshold and variation in the steering rate is equal to or less than a predetermined variation threshold can be set as Example 4. The driving assistance control apparatus for a vehicle according to Example 1 in which the reduced activation area is smaller than the reference activation area in a widthwise dimension of the vehicle can be set as Example 5.

What is claimed is:

1. A driving assistance control apparatus for a vehicle, comprising:
    an acquisition unit that acquires a detected traveling state of the vehicle and a detected traveling environment of the vehicle; and
    a control unit that,
        when a curvature radius of a travel trajectory of the vehicle is equal to or less than a predetermined radius threshold, causes a driving assistance unit to perform collision avoidance assistance using, as an activation area of the collision avoidance assistance, a reduced activation area obtained by reducing a reference activation area, and
        when determining that the vehicle is making a constant turn, causes the driving assistance unit to perform the collision avoidance assistance by using the traveling state of the vehicle and the traveling environment of the vehicle and the reference activation area even if the curvature radius of the travel trajectory is equal to or less than the radius threshold.

2. The driving assistance control apparatus according to claim 1, wherein the control unit determines whether the vehicle is making a constant turn by using a steering rate as the traveling state.

3. The driving assistance control apparatus according to claim 2, wherein the control unit determines that the vehicle is making a constant turn when the steering rate is equal to or less than a predetermined speed threshold.

4. The driving assistance control apparatus according to claim 2, wherein the control unit determines that the vehicle is making a constant turn when the steering rate is equal to or less than the predetermined speed threshold and a variation in the steering rate is equal to or less than a predetermined variation threshold.

5. The driving assistance control apparatus according to claim 1, wherein the reduced activation area is smaller than the reference activation area in a widthwise dimension of the vehicle.

6. A driving assistance system for a vehicle, comprising:
    a driving assistance control apparatus comprising:
        an acquisition unit that acquires a detected traveling state of the vehicle and a detected traveling environment of the vehicle; and
        a control unit that, when a curvature radius of a travel trajectory of the vehicle is equal to or less than a predetermined radius threshold, causes a driving assistance unit to perform collision avoidance assistance using, as an activation area of the collision avoidance assistance, a reduced activation area obtained by reducing a reference activation area, and when determining that the vehicle is making a constant turn, causes the driving assistance unit to perform the collision avoidance assistance by using the traveling state of the vehicle and the traveling environment of the vehicle and the reference activation area even if the curvature radius of the travel trajectory is equal to or less than the radius threshold;
    a detection unit that detects the traveling state and traveling environment; and
    the driving assistance unit that performs the collision avoidance assistance under an instruction from the control unit.

7. A driving assistance control method for a vehicle, comprising:
    acquiring a detected traveling state of the vehicle and a detected traveling environment of the vehicle;
    when a curvature radius of a travel trajectory of the vehicle is equal to or less than a predetermined radius threshold, setting an activation area of collision avoidance assistance to a reduced activation area obtained by reducing a reference activation area; and
    when it is determined whether the vehicle is making a constant turn, performing a collision avoidance assistance process by using the traveling state of the vehicle and the traveling environment of the vehicle and the reference activation area even if the curvature radius of the travel trajectory is equal to or less than the radius threshold.

* * * * *